US008149160B2

(12) United States Patent
Bray et al.

(10) Patent No.: US 8,149,160 B2
(45) Date of Patent: Apr. 3, 2012

(54) METHOD AND APPARATUS USING NON-CONTACT MEASURING DEVICE TO DETERMINE RAIL DISTANCE TRAVELED

(75) Inventors: Alan V. Bray, Spicewood, TX (US); Sean McNeal, Austin, TX (US); Jesse McDaniel, Austin, TX (US)

(73) Assignee: Systems and Materials Research Corporation, Austin, TX (US)

( * ) Notice: Subject to any disclaimer, the term of this patent is extended or adjusted under 35 U.S.C. 154(b) by 9 days.

(21) Appl. No.: 12/913,666

(22) Filed: Oct. 27, 2010

(65) Prior Publication Data
US 2011/0115668 A1 May 19, 2011

Related U.S. Application Data

(60) Provisional application No. 61/255,371, filed on Oct. 27, 2009.

(51) Int. Cl.
G01S 13/08 (2006.01)
(52) U.S. Cl. .......................... 342/104; 342/105
(58) Field of Classification Search ........... 342/104–146
See application file for complete search history.

(56) References Cited

U.S. PATENT DOCUMENTS

| 3,436,656 | A |   | 4/1969  | Brand, Jr. |           |
|-----------|---|---|---------|------------|-----------|
| 5,294,081 | A | * | 3/1994  | Malon      | 246/182 R |
| 5,825,177 | A |   | 10/1998 | Finnestad et al. |     |
| 6,081,769 | A |   | 6/2000  | Curtis     |           |
| 7,174,269 | B2|   | 2/2007  | Ai et al.  |           |
| 2003/0142009 | A1 |   | 7/2003 | Mitsumoto et al. |    |
| 2007/0084972 | A1 |   | 4/2007 | Riley et al. |         |
| 2007/0203640 | A1 |   | 8/2007 | Rousseau   |           |

OTHER PUBLICATIONS

Schubert, R., et al., 'Microwave Doppler Sensors Measuring Vehicle Speed and Travelled Distance: Realistic System Tests in Railroad Environment,' MIOP 95, Jan. 6, 1995, 5 pages.

* cited by examiner

*Primary Examiner* — Timothy A Brainard
(74) *Attorney, Agent, or Firm* — Scheinberg & Griner, LLP; David Griner; John Kelly

(57) ABSTRACT

A non-contact, distance traveled measurement system (DTMS) to calculate speed and distance traveled by a vehicle over rails—more specifically, by trains traveling on standard railroad tracks. Preferably, a pair of short range (near field) microwave-based transmitters/sensors (transceivers) are mounted on the underside of the train and used to key on rail-bed features such as cross ties or tie plates. Preferred embodiments also include infrared sensors as a redundant channel that is less sensitive to moisture in the track bed. Data from the sensors is correlated to determine the time delay between the first and second sensors' passage over objects on the rail bed such as cross-ties or tie-plates. From this time delay, nearly instantaneous velocity can be computed at each given target such as a tie plate (metal target) or a tie (dielectric contrast target). Velocity versus time curves can be integrated over time to derive distance traveled.

17 Claims, 11 Drawing Sheets

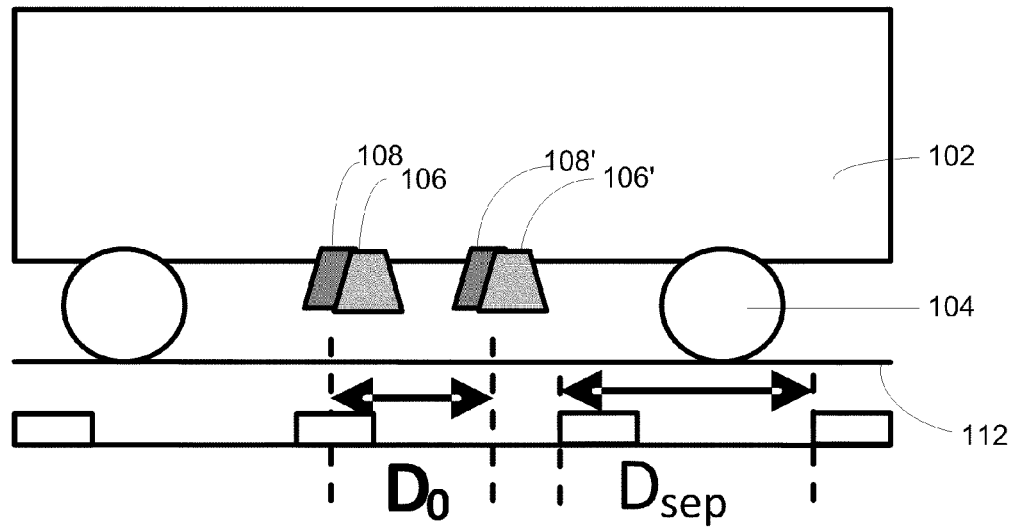
FIG. 2A
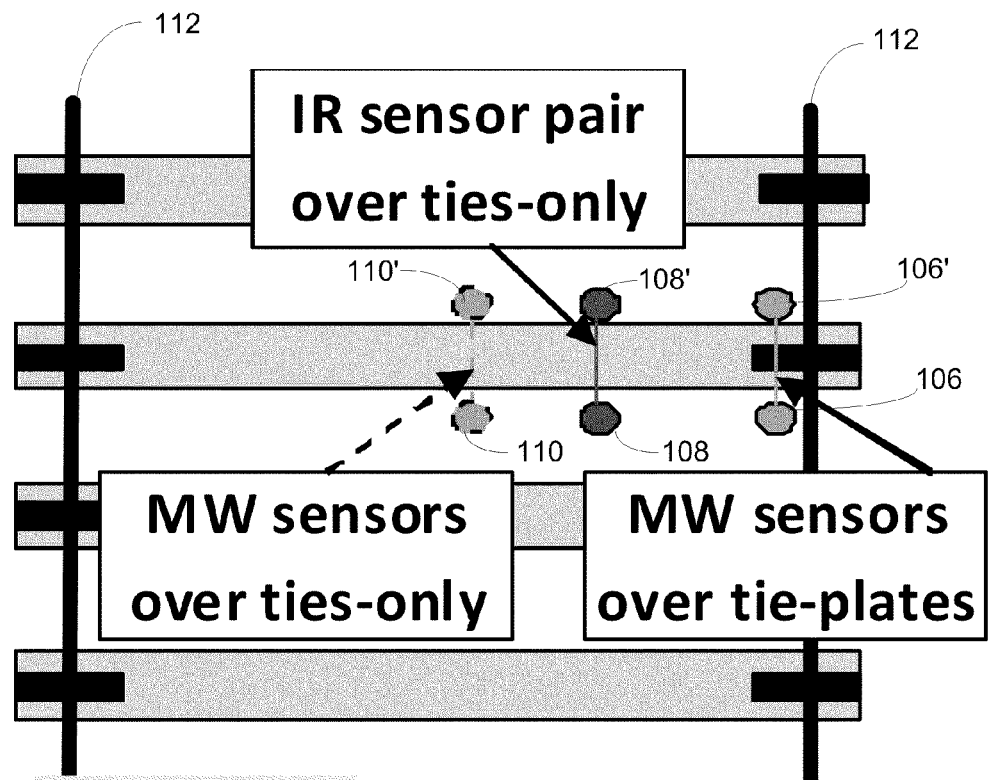
FIG. 2B Sensor configuration options (top view)

Actual distance compared to microwave computed distance.

METHOD AND APPARATUS USING NON-CONTACT MEASURING DEVICE TO DETERMINE RAIL DISTANCE TRAVELED

This application claims priority of U.S. Provisional Application 61/255,371, filed Oct. 27, 2009, and is hereby incorporated by reference.

STATEMENT REGARDING FEDERALLY SPONSORED RESEARCH OR DEVELOPMENT

This invention was made with Government support and the Government has certain rights in the invention.

TECHNICAL FIELD OF THE INVENTION

The present invention generally relates to determining the speed and distance traveled by a vehicle over rails, and more specifically, by trains traveling on standard railroad tracks.

BACKGROUND OF THE INVENTION

Rail-distance-traveled estimates are typically based on a tachometer approach or via GPS, but such systems do not provide sufficient accuracy. Doppler radar and pulse generator systems are more accurate but have environmental problems in extreme conditions. Laser based systems must have an optically clear path to the reflecting surface, and reduced visibility due to snow accumulation or similar conditions are problematic challenges to accurate measurement. Measurement techniques relying on wheel rotation are also known, but these techniques suffer from error due to wheel slippage, wheel wear, and a number of other factors.

What is needed is a distance-traveled measurement system that can be installed on any railroad car, that is accurate and reliable in any weather conditions, and that is accurate to with 5 ft/mile.

SUMMARY OF THE INVENTION

An object of the invention is to provide an improved method and apparatus for calculating speed and distance traveled by a vehicle over rails—more specifically, by trains traveling on standard railroad tracks.

Preferred embodiments of the present invention provide a distance-traveled measurement system (DTMS) utilizing a pair of sensors that can detect rail bed or rail track features mounted underneath a rail car a fixed distance apart and associated hardware/software to measure train velocity and distance traveled. For example, microwave (MW) (primary) sensors or a pair of infrared (IR) (back up) transmitters/receivers (transceivers) may be used to detect features. Data from the two sensors is correlated to determine the time delay between the first and second transceiver passage over objects on the rail bed such as cross-ties or tie-plates. Preferred embodiments of the present invention accurately calculate velocity and determine distance traveled in the high speed and high noise environments expected in rail operations. Preferred embodiments use short range, near field, microwave based sensors that key on metallic objects, such as tie plates, as targets for keying time difference measurements. Preferred embodiments also allow for the measurement of velocity by using non-metallic targets such as wooden or concrete cross-ties. Preferred embodiments also include infrared sensors as a redundant channel that is less sensitive to moisture in the track bed.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which:

FIG. 2A shows the sensor arrangement on the underside of a rail car according to a preferred embodiment of the present invention;

FIG. 2B shows the orientation of the sensors in relation to the cross ties and tie plates according to a preferred embodiment of the present invention;

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION OF PREFERRED EMBODIMENTS

Preferred embodiments of the invention use a non-contact, distance traveled measurement system (DTMS) to calculate speed and distance traveled by a vehicle over rails—more specifically, by trains traveling on standard railroad tracks. Preferably, a pair of short range (near field) microwave-based transmitters/sensors (transceivers) are mounted on the underside of the train and used to key on rail-bed features such as cross ties or tie plates. Reflected microwave energy from two transceivers at a fixed distance apart is correlated to determine the time delay between the first and second transceiver passage. From this time delay, nearly instantaneous velocity can be computed at each given target such as a tie plate (metal target) or a tie (dielectric contrast target). These velocities can be estimated, for example, every 8636 microseconds at 125 mph for a 19" tie to tie distance. Velocity versus time curves can be integrated over time to derive distance traveled.

According to the present invention, preferred embodiments of such a DTMS can be mounted on any rail car and can be used to compute velocity and distance traveled, preferably by using passing rates for tie-plates and/or ties-only without need to know tie separation. It would be highly desirable to provide a distance traveled measurement system that provides a distance traveled (DT) accuracy (defined as $\sigma$/DT or standard deviation/distance traveled) of at least 5 ft/mile. The DT accuracy of preferred embodiments of the present invention has been determined experimentally to be 2-3 ft/mile for runs from 10-50 mph for 30 minutes, with no evidence of accuracy degradation at higher speeds.

In some preferred embodiments of the present invention, additional transceiver pairs—including additional microwave transceiver or transceivers of a different type such as IR sensors—can be used to improve system accuracy and reliability. The different type of transceiver pairs are preferably matched for use together in order to increase weather resistance of the system, with microwave sensors typically operating better in snow and ice, and IR sensors operating better when water is pooled on the rail-bed surface.

Current techniques of measuring distance traveled using wheel rotation suffer from errors due to wheel slippage, wheel wear, and a number of other mechanically based errors. Preferred embodiments of the present invention provide a distance traveled measurement system that is a non-contact device which will not suffer from these mechanical problems and, with a dual suite of MW and IR sensor pairs, will be both weather resistant and cost competitive.

Figure 1:
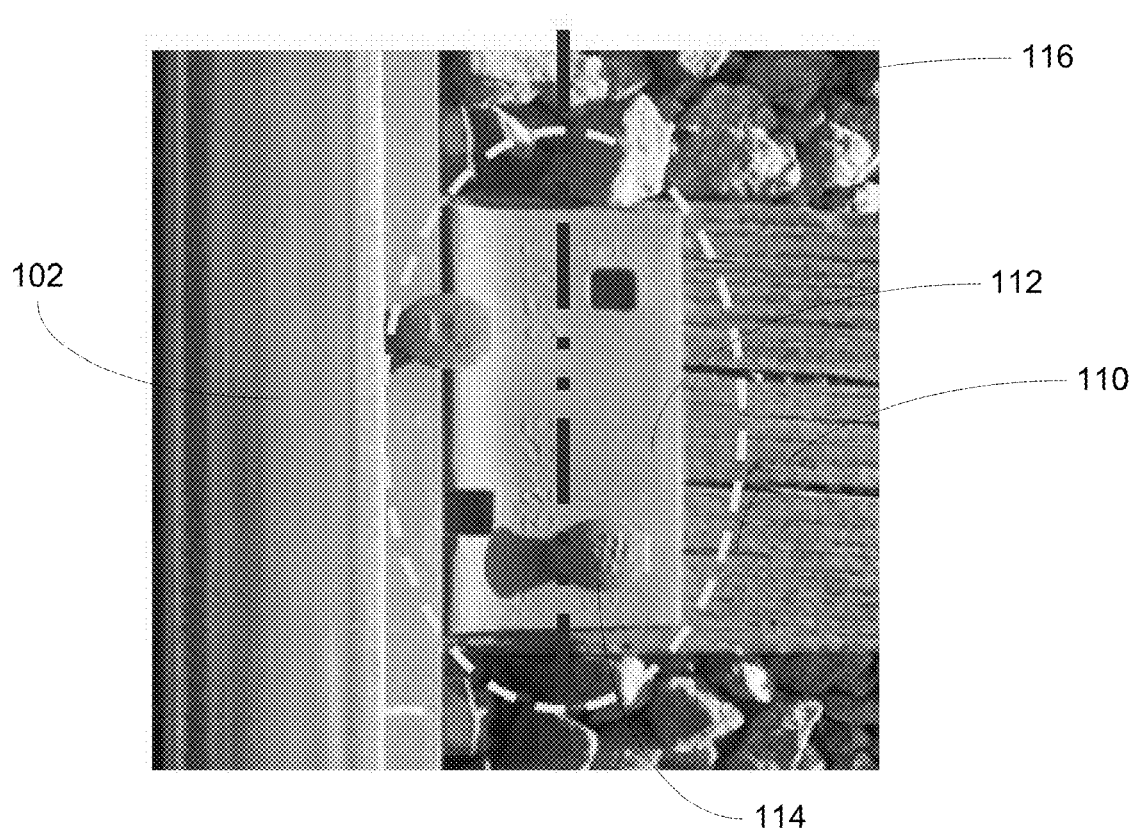
FIG. 1 shows a section of a typical railroad track.

As shown in FIG. 1, railroad rails 102 are typically transversely secured and held to the correct gage (distance apart) by way of wooden cross ties 110. Protective metal tie plates 112 are usually placed between the cross ties 110 and the rail 102. Rails are seated on the plate and the both rail and plate are secured to the cross tie by some form of spike 114 driven into the cross tie through holes in the plate. The cross ties are also anchored into the ballast or rail bed 116 to prevent movement of the track.

According to a preferred embodiment of the present invention, the transceiver pairs are mounted underneath a railroad car so that they are at a fixed distance apart, parallel to the rail, and facing (i.e. focused on) the rail bed. Rail bed features, such as rail ties or tie plates, are thus sensed by both transceivers in the pair as the railroad car travels over the track. FIG. 2A shows the sensor arrangement on the underside of a rail car and FIG. 2B shows the orientation of the sensors in relation to the cross ties according to a preferred embodiment of the present invention.

FIG. 2A shows a railroad car 102 with wheels 104 sitting on top of rails 112. Two transceiver pairs (106/106' and 108/108') are mounted underneath train car 102 a fixed distance apart ($D_O$) and aligned parallel to the rails 112. In the preferred embodiment of FIGS. 2A-2B, transceiver pair 106/106' is a pair of microwave transceivers and transceiver pair 108/108' is a pair of infrared (IR) transceivers.

Transceiver pair 106/106' is preferably mounted so that the transceivers will pass over the portion of the tie plate that extends beyond the rail as the railroad car travels over the track. The transceivers 106 and 106' are preferably directed at an angle perpendicular to the surface of the tie plate. As a result, transmitted microwaves will impact the surface of the tie plate(s) and be reflected back to each transceiver. From a microwave viewpoint the rail and tie plate are conductors sitting in a sea of dielectric material (e.g. dirt, gravel, oil)—providing a high signal-to-noise ratio (SNR). The back (180°) reflection coefficient for a microwave impinging on metal is 100%, much higher than that for impingement on a low loss dielectric material such as the material forming the rail bed. Thus, the metallic tie plates are especially suitable for identification using microwave reflection.

In preferred embodiments of the present invention, X band microwave transceivers can be used, although other types of microwave transceivers could also be used. For example, Applicants have used several power and band types experimentally to check the response. Testing started with the 5 mW X-band (10 GHz frequency) transceiver as the baseline and included a 10 mW X-band, 90 mW Ku-band (18 GHz), and 179 mW Ku-band. In addition, each configuration was tried with a rectangular waveguide and an amplifying horn. The most dramatic response occurred with the 179 mW Ku-band transceiver. Calculating the standard deviation of the non-tie plate regions, the 179 mW signal has a value of 0.023 volts. The 5 mW X-band transceiver has a much smaller value of 0.005 volts, making a factor of around four. For the 5 mW signal, the maximum dynamic range is 0.093 volts whereas the 179 mW signal has a range of 0.668 volts. This is an increase over seven fold over the 5 mW signal. Thus, even though the noise has increased, the response to materials of interest has increased even more significantly.

But while the 179 mW transceiver shows much better response, the 5 mW X-band transceivers still have a number of advantages. X band energy absorption by water is much less than in the K band. Further, the housing for the X-band is more compact and robust than that of the typical Ku system. The X-band transceiver from MICROSEMI® is a self-contained one-piece unit that handles the transmitting and receiving functions; whereas the Ku-band requires 3 discrete components to create the same system, thus requiring a larger footprint and more difficult mounting solution. Nevertheless, in high-noise environments (such as those likely to be encountered in real-world applications), a higher power transceiver may be more desirable.

Unfortunately, the use of microwave transceivers can be problematic under certain environmental conditions, such as heavy rain. The microwave SNR (signal-to-noise ratio) can suffer due to the high microwave energy absorption capacity of water. As a result, it may be desirable to use a second type of transceiver pair. IR sensors can be used in the same fashion as microwave transceivers because the basic function of measuring two responses from the same rail structure (e.g. tie-plate, tie-only, etc.) and computing the correlation time delay between them as the starting point for getting distance traveled will be the same for both sensor types. IR transceivers are advantageous because they are better able to handle very wet conditions. On the other hand, IR data SNR suffers greatly in snow or other frozen precipitation scenarios (sleet, freezing rain, etc.). But because microwave sensors function well with frozen precipitation, the combination of IR and microwave transceivers can be used to improve data quality and system reliability in all types of environmental conditions.

Accordingly, in the preferred embodiment of FIGS. 2A-2B, IR transceivers 108 and 108' are also employed. IR transceiver pair 108/108' is preferably mounted more toward the center of the track so that the transceivers will pass over the ties only. This is because microwave sensors are more sensitive to tie-plates than ties (but detect both), while IR sensors are roughly equally sensitive to ties and tie plates. Using the IR sensors to detect the ties rather than the tie plates allows for significantly more flexibility in mounting the transceivers under the railroad cars. The transceivers 108 and 108' are preferably directed at an angle perpendicular to the surface of the cross-ties. As a result, transmitted IR waves will impact the surface of the cross ties and be reflected back to each transceiver.

Typical IR sensors using wavelengths of 850-900 nm (350 THz) can be used. Transceivers with these types of sensors are typically inexpensive and readily available. It is desirable to use IR sensors with relatively fast switching rates because low switching rates may cause difficulties for high speed applications.

The advantages of including IR sensors are compelling. IR sensors have their physical origins in reflectivity (the weather advantage) and reliability through redundancy. IR sensors can provide significant advantages and a relatively low cost when used as an adjunct to the microwave sensors in MTDS design. The potential gains in robust weather resistance and system reliability make the IR sensor suite a technically compelling and cost effective addition to MTDS.

Optionally, additional transceiver pairs could also be used, such as an additional microwave transceiver pair 110/110' mounted so that the additional microwave transceiver pair will pass over the ties only, instead of the tie plates. The use of an additional pair of microwave sensors provides an additional level of redundancy, while the use of "ties only" detection allows for maximum placement flexibility. Microwave transceivers over ties-only will preferably use higher power transmitters and/or additional frequency tuning to achieve adequate SNR at the required standoff distances (described below).

Finally, while the present invention has been described in detail using microwave sensors, infrared sensors, or a combination thereof, any sensor type that can detect regular features from the rail bed or railroad track may be used in similar fashion and is within the scope of the present invention. Depending on the surface type of the rail bed or the environmental conditions, other types of sensors may prove more useful. For example, a subway system may not have rail ties, but instead have smooth concrete rail bed and a narrow range of environmental conditions. In this case, a mechanical system that depends on direct contact rather electromagnetic reflections may prove a better fit.

In operation, rail features such as rail ties and tie plates cause a change in the microwave (MW) and infrared (IR) response as the sensors pass over them. The signals from each sensor pair are correlated to determine the time delay between the transceivers sensing a particular rail bed feature. This time delay is used to calculate train velocity. The velocity during this period is given by:

$$v_i = \frac{D_0}{\tau_i}$$

where $\tau_i$ is the $i^{th}$ time delay and $D_0$ is the distance between transceivers. The velocity versus time curve (v(t) vs. t) can be integrated to get distance traveled versus time (d(t)).

The frequency of the velocity measurements is preferably fine-grained enough to provide the five feet-per-mile precision desired. Depending on the separation distance between rail ties, velocity measurements will be generated roughly every 8-12 inches. For a train traveling 125 mph, this will happen about every 4545 microseconds ($4.5 \times 10^{-3}$ sec.). At 125 mph, the time difference between the two transceivers passing a targeted feature should be measured to within ±4.1 microseconds. This ~1000:1 ratio provides the 1000:1 precision (5 feet/1 mile) required in distance traveled.

If the transceivers in a pair are separated by less than the distance between the cross ties ($D_{sep}$)—typically about 11 inches—they will both register the same tie plate before the front transceiver detects the next. From that point forward, the processing of these data yields distance traveled by using the steps:

Measure the output of each transceiver as a function of time.

Cross correlate transceiver signals, get the delay time τ between tie passages.

Compute velocity at the $i^{th}$ tie plate location, and $$v_i = \frac{D_0}{\tau_i},$$

where $D_0$ is the distance between transceivers ($D_0$<tie plate separation≈11 in.).

Compute distance traveled as d(t)=∫v(t) dt.

When installed, each transceiver package will preferably occupy a volume of roughly 4×4×5 inches, and would be installed so as to be above the rail top (typically 8 inches above the rail bed). More preferably, the transceivers should not extend below 3 inches above the rail top. The transceivers can be installed inside or outside the rail. The two primary targets for reflection are tie plates and the ties themselves, and both are available from either side. To insure the most stable standoff, the sensors should be mounted to the side of the frame/wheels/axle assembly that acts as a single piece with a fixed standoff.

For microwave transceivers, typically the sensor height is largely determined by the band, and an X band transceiver and horn will usually be around 5 inches tall and occupy a square of 4 inches on a side which leaves room for signal conditioning electronics. Cables will run from the sensor to the signal processing computer. The computer can be mounted below the car or mounted inside the car and connected via a car penetration to the transceivers below. If the computer is mounted underneath the car, an environmentally robust enclosure should be used. Power is preferably supplied via battery operation.

Because the transceivers will be operating in a potentially harsh environment, they will preferably be packaged in a hermetically sealed case. The sensor should operate through a dielectric window—typically formed from a tough composite such as G9 fiberglass. This window does not need optical clarity, and should be tolerant of a build up of dirt and grime. In preferred embodiments, a passive means of keeping the dielectric window somewhat clean could be employed, although the transceiver will preferably be able to operate through a build up of wet or dry dirt up to ⅛ inch thick. Also, the temperature of the transceivers can preferably be compensated for using thermistors to keep the device within an acceptable temperature range.

Figure 3A:
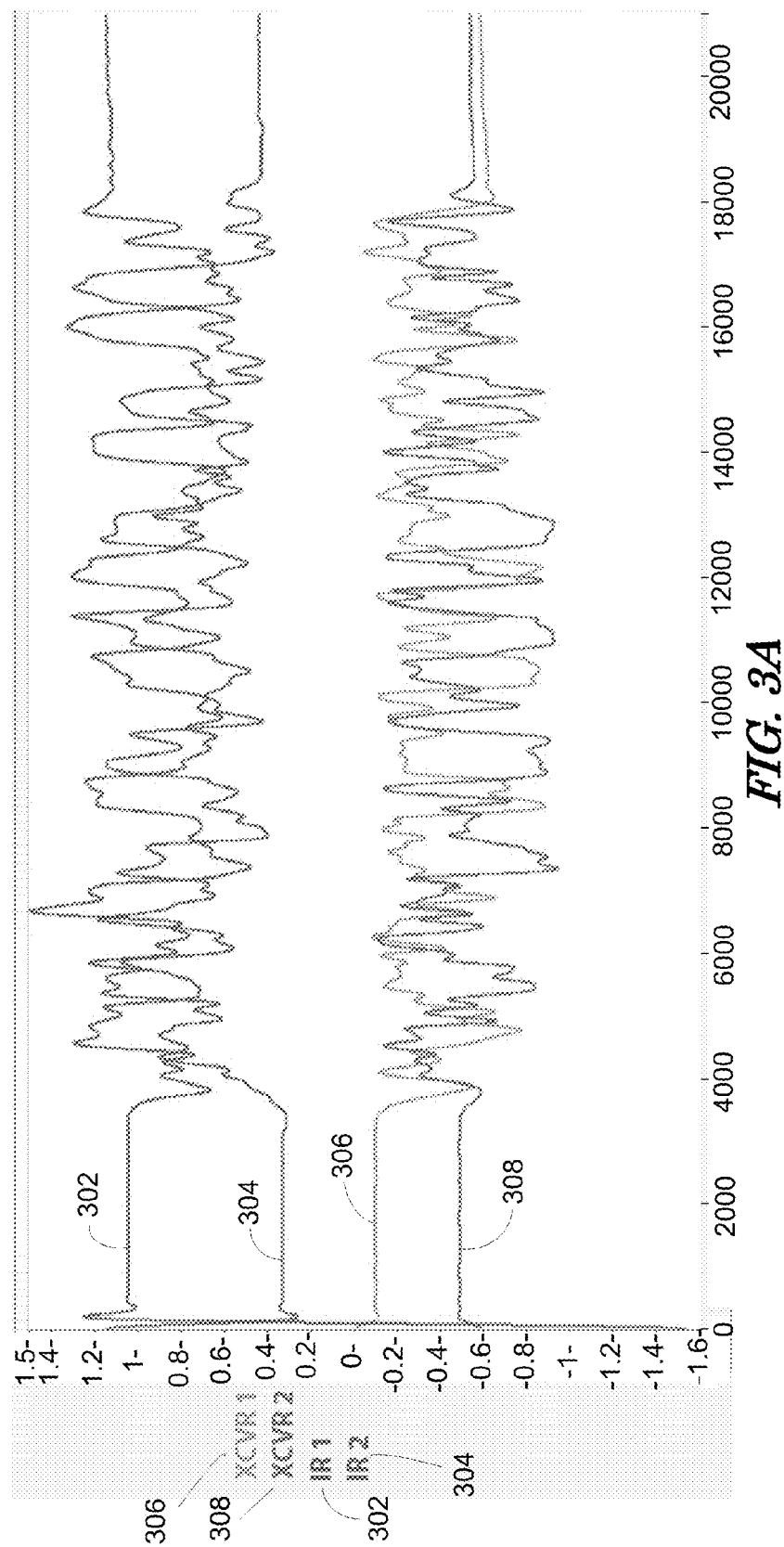
FIG. 3A shows a raw data record of an IR transceiver pair and an X-band microwave transceiver pair according to a preferred embodiment of the present invention.
Figure 3B:
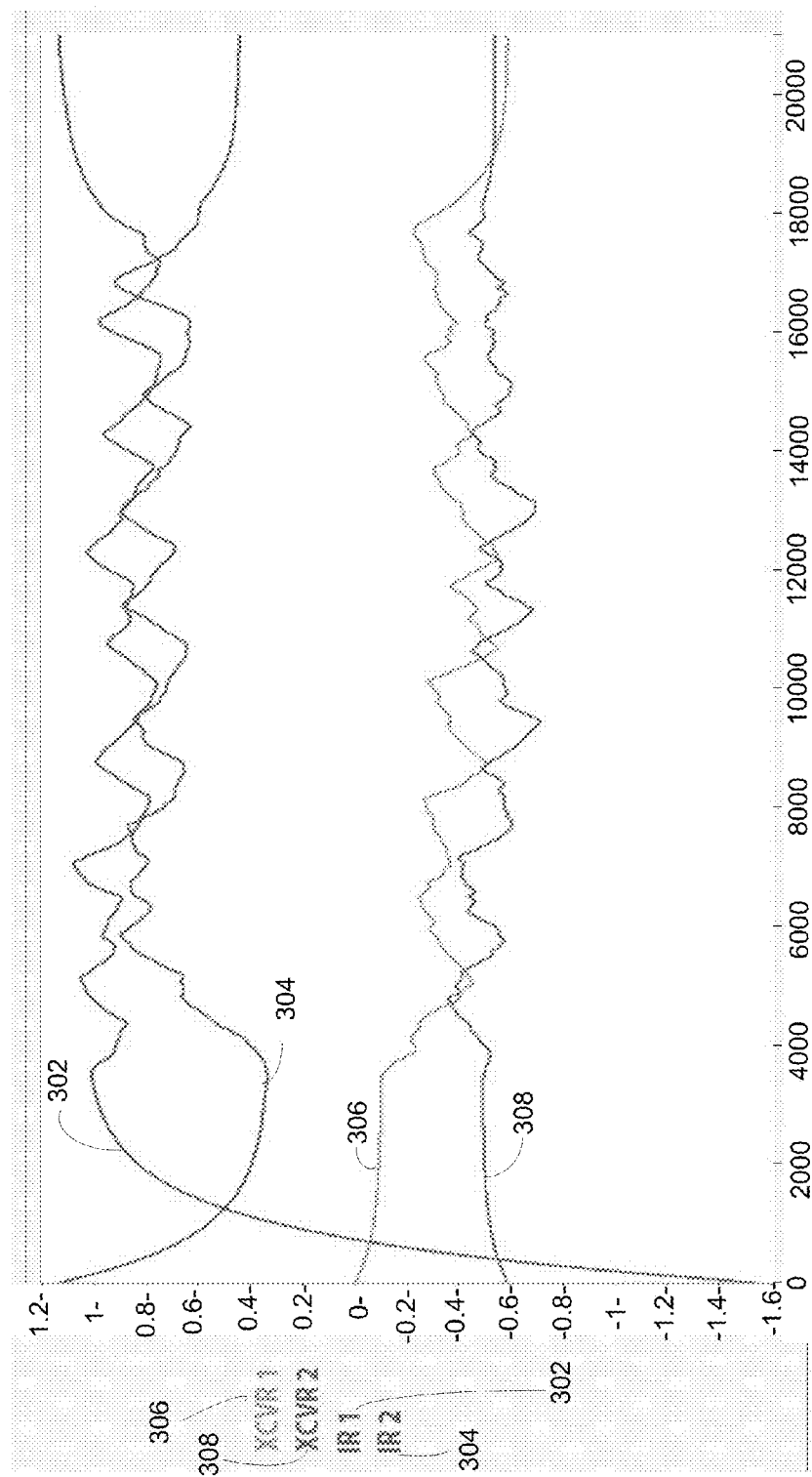
FIG. 3B shows the raw data of FIG. 3A after a bandpass filter has been applied.

FIG. 3A shows a raw data record of an IR transceiver pair (302, 304) and an X-band microwave transceiver pair (306, 308). The microwave transceivers were mounted over the tie plates, while the IR transceivers were mounted over cross ties only. The raw data signal from all sensors appears very noise laden. The background noise can be removed by filtering the signals in a band near the tie passing frequency. This frequency is given by (from the inverse of the period, $t=D_0/v$):

Frequency of tie passage=Train velocity(in./sec.)/Sensor separation $D_0$(in.)=$v/D_0$ As an example, in the experiment producing FIG. 3A, testing was done by towing a wagon with the sensors mounted on a man-powered wagon. The man-towed velocity is roughly 1 mph (1*5280*12/60*60) or 17.6 in./sec. Assuming that $D_0$ (the distance between the sensors in each transceiver pair) is roughly 11 inches, the frequency of tie passage is roughly 1.6 Hz. Therefore, a reasonable bandpass filter setting might be from 1 to 2.2 Hz, or simply high passed at 2 Hz or so. FIG. 3B shows the 2 Hz high pass filtered (a 2nd order Chebyshev filter in this case) output from an experimental track run over tie plates—a relatively noise free signal at this stage (prior to any other processing). The post filtered data have easily identifiable sinusoid-like features that correlate well between sensors, and produce excellent estimates of $\Delta t$—the time delay between sensor pairs for detecting the same rail bed feature.

From FIG. 3B it can be seen that filtering makes features of the rail bed standout. This technique was experimentally applied to a run over 3 rail tie-plates. The results of the filtering showed that tie-plates were excellent targets for getting a time-delay solution. The length of tow for the tie-plate tests was typically 3 ties long or about 5 feet. Table 1 summarizes the time delays computed from correlating the MW signals for a 3 tie-plate run.

TABLE 1

Example three (3) tie-plate run data summary

| | Trigger 1 | Trigger 2 | $\Delta t$ | in/msec | Dist (in.) | Total Dist. (in.) | Act. Dist (in.) |
|---|---|---|---|---|---|---|---|
| Plate 1 | 6977 | 9768 | 2791 | 0.003 | 0 | 0 | 0 |
| Plate 2 | 14291 | 15743 | 1452 | 0.006 | 25.023 | 25.023 | 24 |
| Plate 3 | 18229 | 19779 | 1550 | 0.005 | 21.534 | 46.557 | 46 |

Figure 3C:
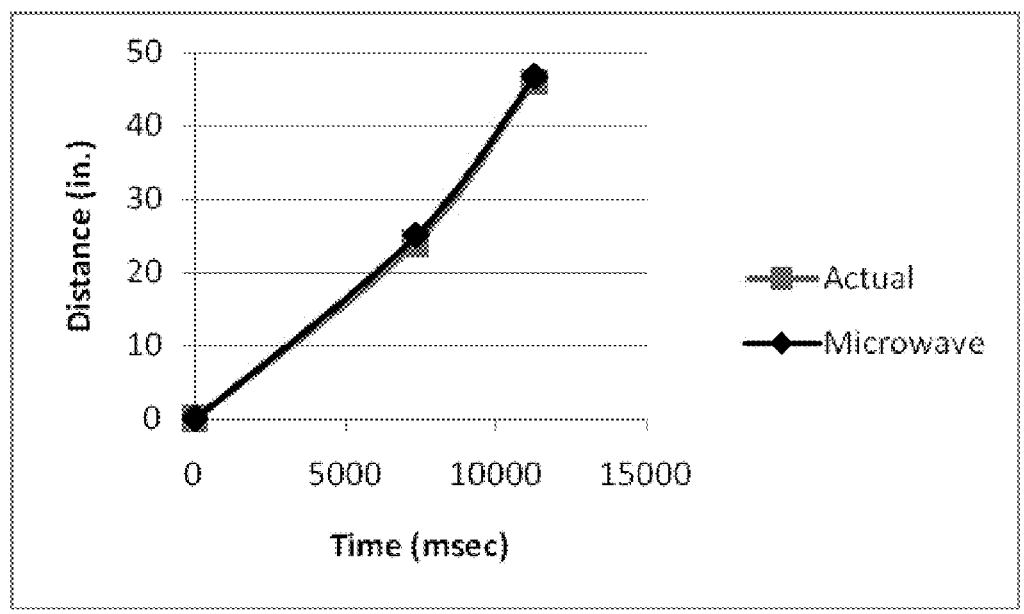
FIG. 3C shows a graph of actual measured distance compared to computed distance using the data of FIGS. 3A-3B.

Although the distances were not long in this particular experimental rail bed run, there was still an opportunity to compute distance traveled and compare it with tape-measured data. FIG. 3C shows the result and compares actual distance traveled with computed distance traveled for both IR and MW sensors in the tie-plate detection mode.

Figure 4A:
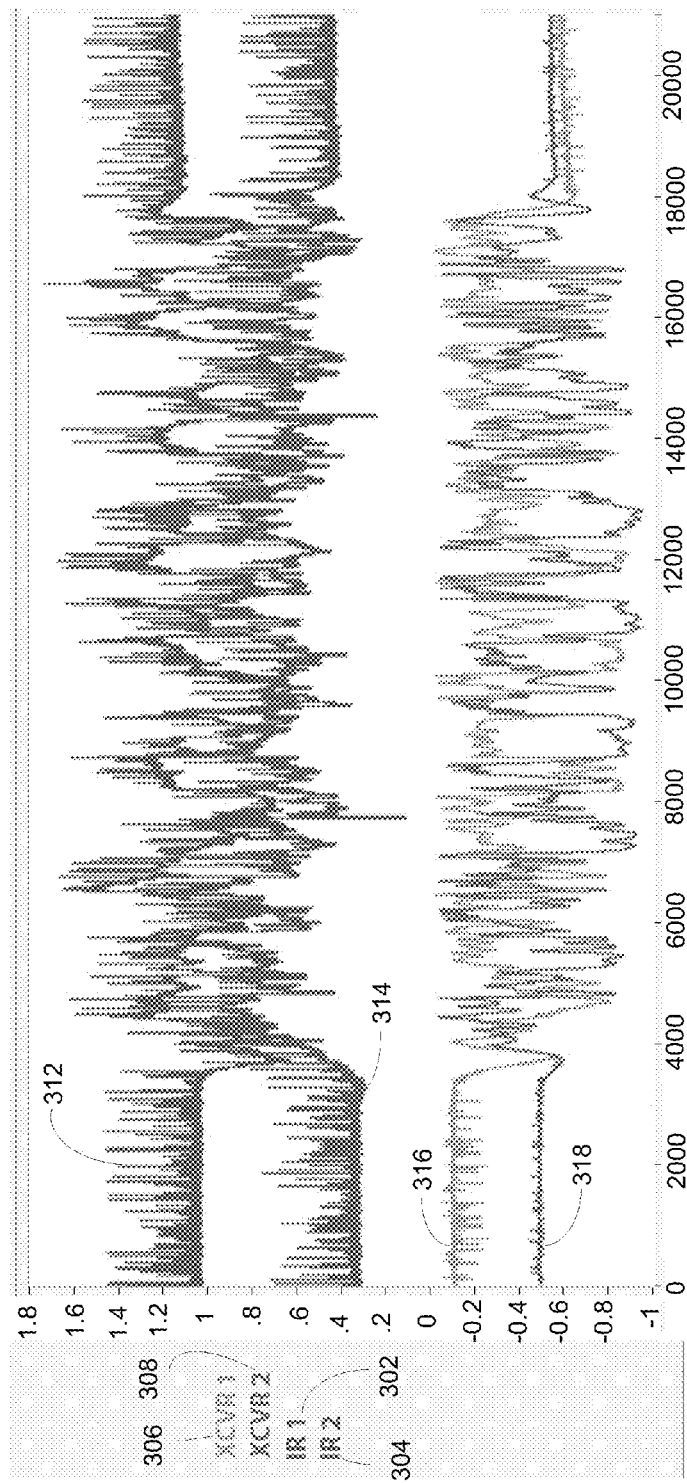
FIG. 4A shows a raw data record of an IR transceiver pair and an X-band microwave transceiver pair with both transceiver pairs mounted over the cross ties only, according to a preferred embodiment of the present invention.
Figure 4B:
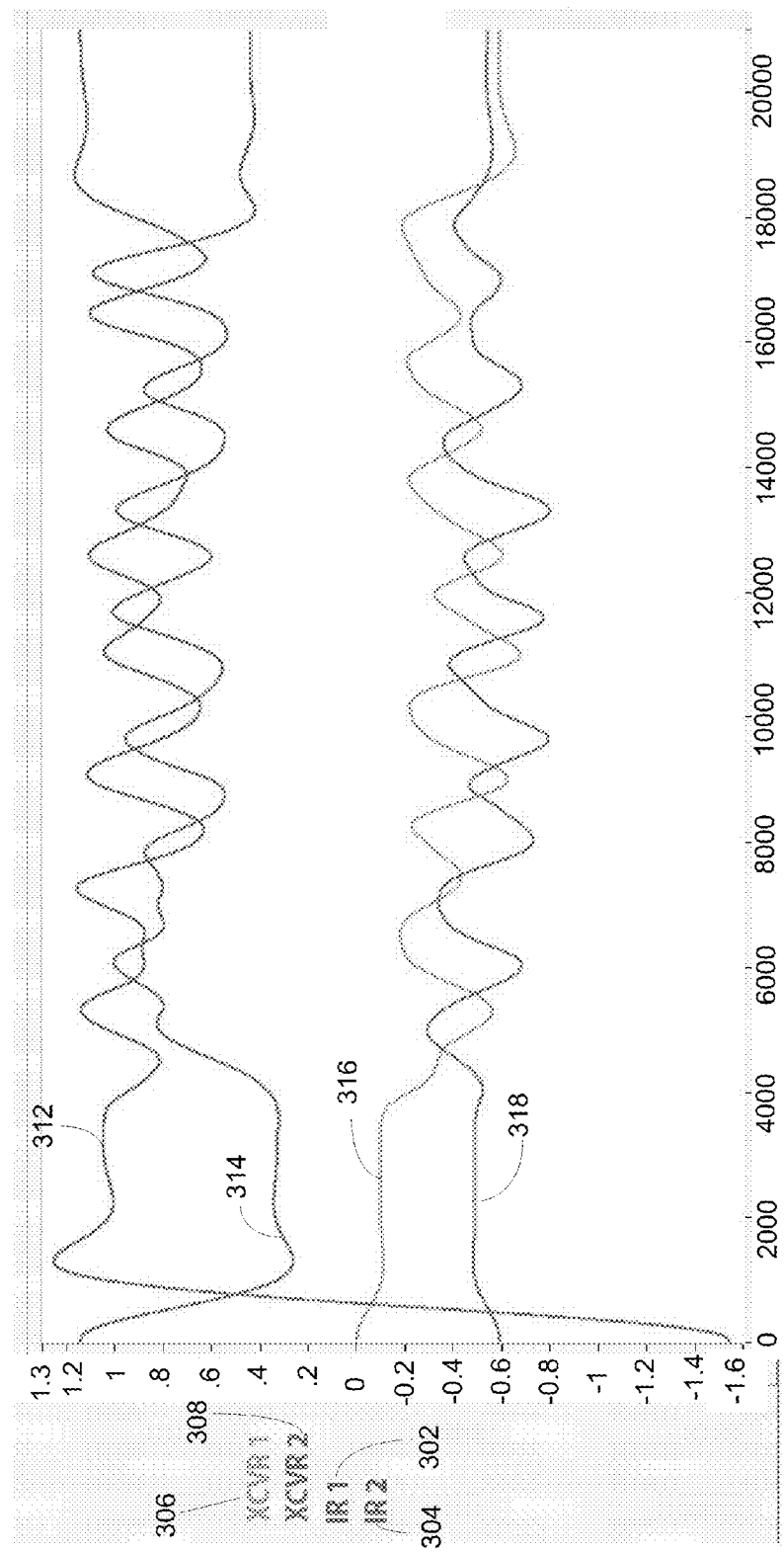
FIG. 4B shows the raw data of FIG. 4A after a bandpass filter has been applied.

FIG. 4A shows a raw data record of an IR transceiver pair (312, 314) and an X-band microwave transceiver pair (316, 318) with both transceiver pairs mounted over the cross ties only. The advantage of this type of sensor and mounting configuration is that it can be implemented in the center of the rail car because tie-plates are not required. FIG. 4B shows a filtered (using a 1st order Butterworth filter) ties-only signal. Significantly, the IR signal does not look much different from FIG. 3A since the IR signal has nearly as good a reflection coefficient with or without a metal reflector. Despite the expected loss of microwave SNR, IR sensor data in FIG. 4A can still be processed to a state that allows excellent distance-traveled estimation. Table 2 illustrates the steps in processing these data on a tie by tie basis, and computes distance traveled on a cumulative tie basis for comparison to actual distance traveled.

TABLE 2

Computations for distance traveled for ties-only detection

| | Txvr 1 (ms) | Txvr 2 (ms) | $\Delta t$ msec | Vel. in/msec | Dist (in.) | Total Dist. (in.) | IR 1 (ms) | IR 2 (ms) | $\Delta t$ msec | Vel. in/msec | Dist (in.) | Total Dist. (in.) | Act. Dist (in.) |
|---|---|---|---|---|---|---|---|---|---|---|---|---|---|
| Tie 1 | 5050 | 5756 | 706 | 0.011 | 0.000 | 0.000 | 5123 | 5850 | 727 | 0.011 | 0.000 | 0.000 | |
| Tie 2 | 7030 | 7667 | 637 | 0.013 | 22.827 | 22.827 | 7071 | 7676 | 605 | 0.013 | 22.119 | 22.119 | 23 |
| Tie 3 | 8724 | 9435 | 711 | 0.011 | 21.049 | 43.876 | 8742 | 9457 | 715 | 0.011 | 21.739 | 43.858 | 45 |
| Tie 4 | 10684 | 11322 | 638 | 0.013 | 22.447 | 66.323 | 10731 | 11353 | 622 | 0.013 | 22.800 | 66.658 | 68 |
| Tie 5 | 12239 | 13004 | 765 | 0.010 | 19.340 | 85.663 | 12278 | 12979 | 701 | 0.011 | 19.735 | 86.393 | 88 |
| Tie 6 | 14272 | 14943 | 671 | 0.012 | 21.697 | 107.360 | 14306 | 14955 | 649 | 0.012 | 23.454 | 109.847 | 110 |

Figure 4C:
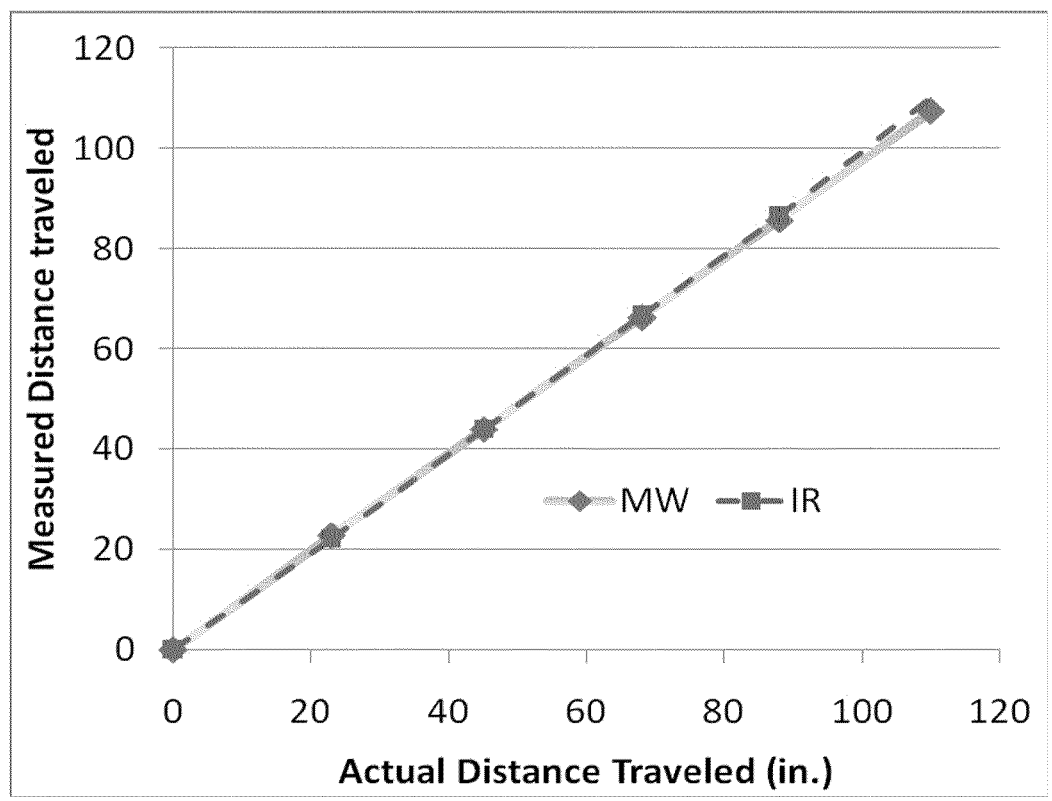
FIG. 4C shows a graph of actual measured distance compared to computed distance using the data of FIGS. 4A-4B.

FIG. 4C is a plot of measured versus actual distance traveled for the IR and MW sensors. Perfect measurement would mean that each set of data lie along a 45° line, and as can be seen the results were very nearly, if not actually, on the 45° line.

As shown in FIGS. 3A-4C, despite the noisy microwave and infrared environment, standard digital filtering routines resulted in signal-to-noise ratios from 10-20 dB. Combining infrared (IR) sensors with microwave (MW) sensors will result in robust weather resistance, with microwave operating better in snow and ice, IR sensor better in flooding rains. The IR/MW sensor combination also results in higher system reliability/availability through sensor redundancy.

Figure 5:
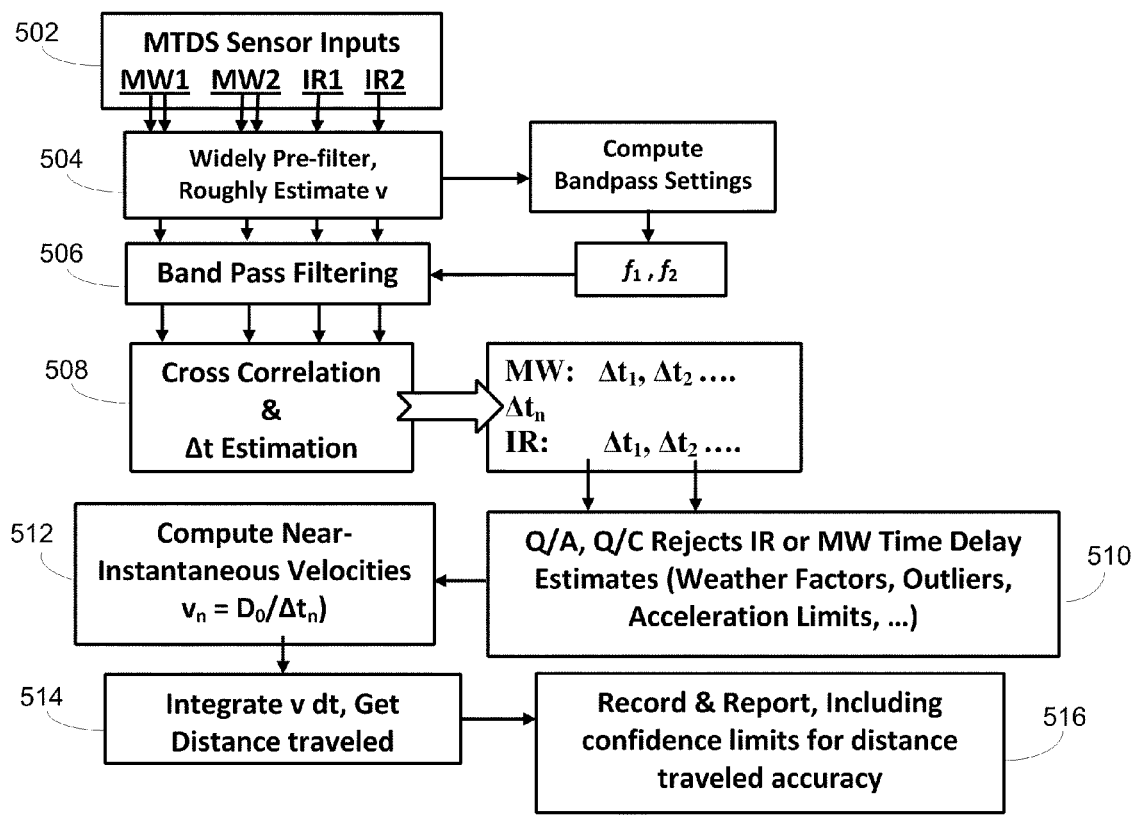
FIG. 5 is a process diagram that shows the steps in a signal and data process system for a DTMS according to a preferred embodiment of the present invention.

FIG. 5 is a process diagram that shows the steps in a signal and data process system for a DTMS according to a preferred embodiment of the present invention. Data is first collected by the transceiver pairs, such as by the tie-plate microwave transceivers, the IR transceivers, and the tie-only transceivers as described above. The raw data signals are output from the MTDS sensor outputs 502. A typical MW sensor has two outputs—one for In-phase (I) and another for Quadrature (Q) components. Either or both can be used.

Appropriate filter settings can be computed (504) to optimize the signal-to-noise ratio (SNR) of the raw signal from each transceiver pair. Preferably, the SNR is optimized first by widely pre-filtering and roughly estimating v. Here, a rough estimate of v is obtained for setting the filter bandwidth. This estimate is refined during the remainder of the processing. Preferably a bandpass filter with adjustable limits can be used to filter the raw signals. The computation for the filter settings will preferably be based on the equation that the frequency of rail feature (e.g. tie-plates) passage is $F=v/D_0$. The velocity v may have to be roughly estimated from the last few (on the order of 1-5) data points to set the bandpass limits.

Once the sensor signals have been filtered (506) the data from the multiple transceiver pairs can be cross-correlated to derive the time delay between passages of the two transceivers over the same tie-plate or tie (508). Time delay is the difference in time between receipt by the first transceiver of a reflection from a tie-plate (or tie), and the receipt by the second transceiver of a reflection from passage over the same tie-plate (or tie). The accuracy of the $\tau$ measurement drives the accuracy of the entire system in producing distance traveled estimates. Time delay is estimated in one of two ways:

From correlation techniques that compute the magnitude of a correlation function for each possible time separation between two pulse returns. The time delay $\tau$ is that time separation between the two pulses that have the highest correlation. These are data volume and computer speed sensitive methods.

Peak seeking techniques that use a threshold detection algorithm to estimate $\tau$. These are very quick estimates to produce and in the right signal to noise ratio environment can be competitive in accuracy with correlation methods.

Figure 6:
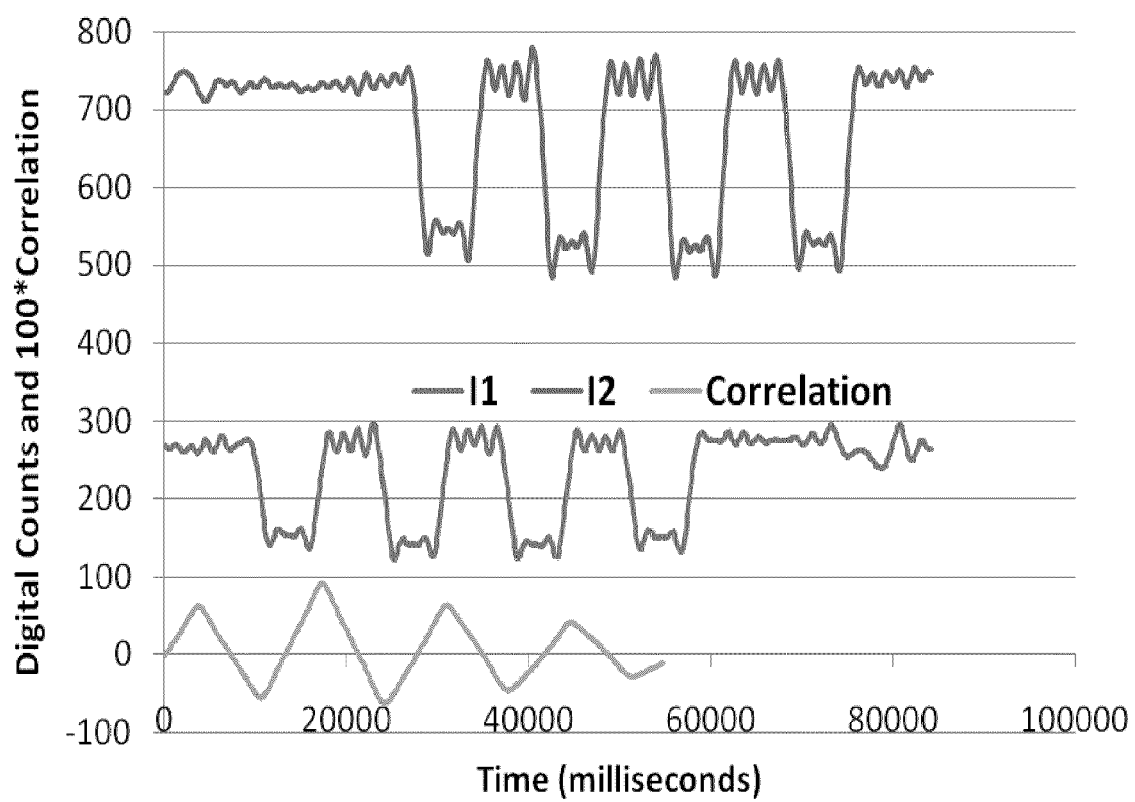
FIG. 6 shows a graph of raw microwave in-phase (I) data experimentally produced by two microwave transceivers in a transceiver pair, along with the correlation function produced by cross-correlating the two signals to derive the time delay according to a preferred embodiment of the present invention.

FIG. 6 shows graphically an example of the raw microwave in-phase (I) data experimentally produced by two microwave transceivers in a transceiver pair, along with the correlation function produced by cross-correlating the two signals to derive the time delay between passage of the two transceivers over the same tie-plate (or tie). Maximum correlation occurred at a time lag of 17,391 microseconds. In this example, the transceivers were separated by 2.9 inches. Using the formulas described above produces a velocity estimate of 0.166 ft/sec., which in this case agreed perfectly with the velocity registered by a gantry scanning system used to confirm the experimental results.

The correlation algorithm is of order $n^2$, meaning that for n data points, the number of calculations required is the square of the value. For a large sample size, the calculation time required is not insignificant. Preferably, calculation time can be reduced by placing limits on the window of samples to be checked for correlation rather than checking all samples. About a ten percent change in speed is allowed per millisecond. For example, if the current speed is 20 mph, the points to check are those where the speed corresponds within 18-22 mph at the next tie plate. Using this technique, the number of data points to be processed can be reduced by 75-80%.

In preferred embodiments of the present invention, the time delay ($\Delta t$) calculation would take place whenever a significant change in microwave signal occurs (at least every feature such as a tie-plate) providing a nearly instantaneous velocity estimate of the train roughly every 20 inches (typical wooden tie separation) of train travel. The method does not require knowledge of the distance between features (such as the tie-plates). Only knowledge of the fixed distance between transceivers is necessary.

Referring again to FIG. 5, in preferred embodiments, once the $\Delta t$ values for each sensor pair have been determined in parallel, the $\Delta t$ values to be used in the actual velocity/distance determination must be determined (510). Ideally, the $\Delta t$ values for all sensor pairs will be identical. In practice, however, differences are expected and only one would be used for final $\Delta t$ estimates based on a comparative QA/QC algorithm. For example, in a weather condition such as snow, the microwave transceiver pair is expected to do well, but the infrared (IR) pair would not because IR reflects from the surface of the ice or snow, and doesn't penetrate to the rail bed. The QA/QC algorithm makes the selection of the most accurate sensor (MW or IR) data based on a priori knowledge of train motion. The QA/QC can also be set up to eliminate outliers or errors, such as when a calculated velocity change is physically impossible (e.g., a 10 fold velocity increase over millisecond time frames) or when velocity changes exceed expected values based upon a train's inherent acceleration limits based on engine and car weight/count. QA/QC algorithms will preferably be very specific and reflect physical rational for editing outliers. Any data showing an increase in velocity beyond what would be expected from calculating $\int a(t)\, dt$ with appropriately set limits would be suspect for outlier editing. In instances where both sensor pairs are making detections with roughly equal accuracy statistical outliers can be edited without bias since the sensor pairs are independent.

The reliability of a system is directly proportional to the amount of redundancy available in case of a failure. Preferably, the QA/QC schemes envisioned here would immediately revert to passing the data of an un-failed pair in the event of a catastrophic loss of the other sensor pair.

Figure 7:
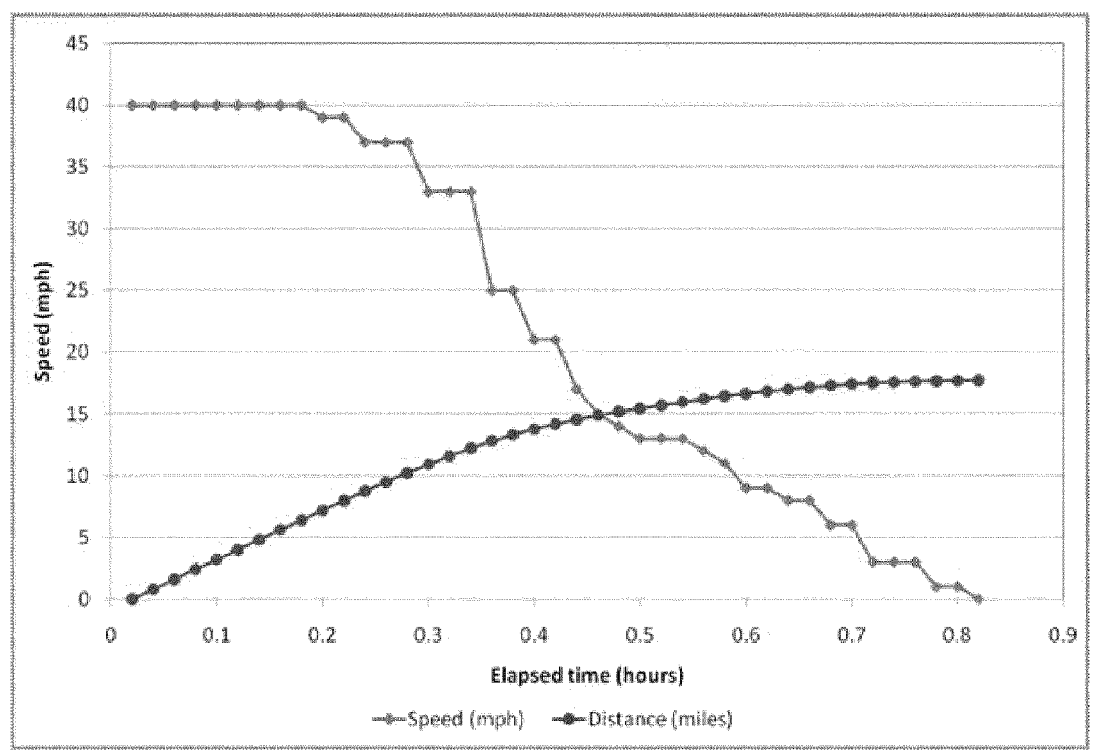
FIG. 7 shows a graph of velocity versus time and a graph of distance traveled versus time generated by integrating the velocity versus time curve.

Once the appropriate sensor data has been selected, the velocity can be calculated (512) as described above. The velocity versus time curve is then integrated to get distance traveled (514). FIG. 7 illustrates the generation of distance-traveled curve for a train deceleration from 40 mph to a dead stop. The velocity data has been numerically integrated to get distance traveled, which is also shown in the figure. As shown in FIG. 7, at the end of travel the train had gone 17.70 miles. At any intermediate time, the distance traveled can also be determined from the curve. Once the distance traveled has been determined, the values can be recorded by a suitable computer system, along with calculated confidence limits for accuracy (516).

Using the system described above, experimental tests were performed to demonstrate the accuracy of the distance-traveled measurement through calculations using data from the sensors. The DT accuracy ($\sigma$/DT), that is, the standard deviation/distance traveled, was experimentally shown to be 0.05%, which is roughly half the required accuracy of 5 ft/mile (0.095%). The experimental results demonstrate that the system, with proper manipulation of the microwave (MW) and infrared (IR) sensors and calculation of the data, is capable of satisfying an accuracy requirement of 5 ft/mile.

Time Delay Error

The signals from each sensor pair are correlated to determine the time delay between the transceivers sensing a rail bed feature. This time delay ($\Delta t$) is used to calculate a virtually instantaneous train velocity. Time delay is included in many calculations above. The error in this measurement, the time delay error, can be calculated in the following way.

In a typical distance traveled measurement scenario, assume that there are roughly 3300 samples of time delay taken per mile ((5280 ft/mi.*12 in./ft)/19 inches per tie-plate to tie-plate average distance). Time delay estimation error depends on $$\Delta \tau = f(\text{sample size, signal to noise ratio})$$

while sample size related errors include $$\text{sample size error} = \Delta s = \mathcal{J}(\text{velocity, sample rate, digitization error} \ldots)$$

and SNR $$\text{SNR} = f(\text{transceiver-track separation, background noise, weather} \ldots).$$

Modeling these dependencies reliably is difficult at best, and typically doesn't estimate real world error magnitudes well. An exception is the digitization error discussed in greater detail below.

The accuracy of total $\tau$ as measured above, or $\Delta \tau_{Tot}$, is a combination of a number of factors. In addition to those above, there are other known sources of error. As a rough lower bound the total error, $\Delta \tau_{Tot}$, would be $$\Delta \tau_{Tot} = (\Delta \tau_m^2 + \Delta \tau_{dig}^2)^{1/2}$$

Where $\Delta\tau_m$ is the error in measurement and $\Delta\tau_{dig}$ is the digitization error, which will now be described.

Digitization Error

For each pulse return an independent estimate of velocity is computed. This estimate is the ratio of the fixed distance D between transceivers or lasers divided by the time required to register the same feature (a tie plate or tie). FIG. 1 shows the sensors on a rail car and FIG. 2 shows a series of return pulses collected from the laboratory simulation set up. The time between pulse returns, $\tau$, is the result of a correlation calculation, and the velocity estimate over one tie plate to tie plate (or tie to tie) distance is $$v=D/\tau$$

The sampling process is discrete, i.e. the pulse history data are sampled s times between pulses. The sampling rate, s., is fixed by the A/D rate. To within the granularity of the sampling process we can equate $$\tau=s/s^*$$

so the velocity estimate in terms of the sample size and rate becomes $$v=Ds^*/s$$

The granularity of the velocity estimate is the change in velocity between samples, or $$\Delta v = v_i - v_{i+1} = Ds^*[1/s - 1/(s+1)]$$

The velocity estimate cannot be known any more accurately than this. Note that as the sample size increases without bound s approaches (s+1) and $\Delta v$ goes to zero as one would expect. Assuming that $\tau$ is estimated perfectly the error in velocity estimation still has an expected value of $\Delta v/2$. This can be translated to the granularity in distance using the relationship $$\Delta d = \Delta v \tau = \Delta v s/s^* = D[1/s - 1/(s+1)]$$

Once again, the limit as s approaches s+1, $\Delta d \rightarrow 0$ as expected. This is essentially a lower limit on the accuracy of the distance error that accrues during one tie plate to tie plate (or tie to tie) distance. The cumulative distance measured over a reference distance dr (e.g. 1 mile) is given by $$\Sigma \Delta d_i = (d_r/D)\Delta d = d_r[1/s - 1/(s+1)]$$

By the time the inter tie-plate (or tie) sample size reaches 1000 the error per mile is 5 feet, and 0.053 feet at 100,000 samples per inter tie-plate travel. Modern sample rates support 106 samples per second, so this is not expected to be a large error contributor.

Error Analysis Specific to MTDS Distance Traveled Solutions

The distance traveled is computed in the DTMS as the answer to the definite integral $$\text{Distance traveled} = DT = \int_{n=1}^{N} v_n dt = vt|_{n=1}^{N}$$

Where $v_n$ is the $n^{th}$ virtually instantaneous velocity while traveling between two consecutive rail features such as a tie-plate or a tie-only, and is given by $$v_n = D_0/\Delta t_n \text{(units in the report are in mph)}.$$

Where $D_0$ is the distance between the IR or MW sensor pairs $\Delta t_n$ is the time measured by time domain correlation of the IR and MW signal pairs as they receive the reflections of the same bed rail structure (e.g. in the rail spur experiments to date these were very old wooden ties).

$\int_{n=1}^{N}$ and $|_{n=1}^{N}$ are the integral and evaluation signs with limits from n=1 to N, where N is the number of measurements needed to get DT. As an example if DT were 10 miles and 100 measurements were made every mile N would be 1000 samples. This is also the N associated with the standard deviation of the time delay measurements.

The error in one measurement segment of DT is a measurable quantity. It is given by $$\delta(vt|_{n=1}^n) = v\delta t + t\delta v$$

$\delta t$ and $\delta v$ are the error components for one measurement segment, and represent the variability in the measurement of time and velocity by the system. $\delta t$ is not involved with the measurement of the of time delay, but is essentially clock error, and is for all practical purposes is zero. $\delta v$ is essentially the variation in velocity that was measured—which is a random variable, and is measurable as the standard deviation of the velocity in a group of instantaneous velocity estimates obtained at constant speed. We make the common assignment $\delta v = \sigma_v$, and that t in this instance is in fact equal to $\Delta t$, the time length of the measurement segment. Then $$\delta(vt|_{n=1}^n) = \sigma_v D_0/v_{ref}$$

where $v_{ref}$ is the average reference speed during the constant speed run. $V_{ref}$ is used here because it is an independent measurement and should be close to the true speed. For a constant speed run the integrals above become sums, and $$\sigma_{DT} = \Sigma_{n=1}^{N} \sigma_{vn} D_0/v_{ref} = D_0/v_{ref} \Sigma_{n=1}^{N} \sigma_{vn} = N\sigma_{vn} D_0/v_{ref}$$

This is then normalized by the distance traveled to get $$\sigma_{DT}/DT = N\sigma_{vn} D_0/DT v_{ref}$$

The accuracy requirement of <5 feet per mile is then given by $$\sigma_{DT}/DT_{req} = N\sigma_{vn} D_0/DT v_{ref} I_{req} \leq 0.1\%.$$

Thus the error in the distance traveled is expressed as a function of the error in the measurement of velocity over a segment of track length roughly equal to a tie-to-tie distance.

Using these formulas, the error in distance traveled (DT) for this type of measurement device, and normalized by the magnitude of distance traveled to fit the requirement specified as 5 ft/mile error in DT, is given by:

$$\sigma_{DT}/DT_{req} = N\sigma_{vn} D_0/DT v_{ref} I_{req} \leq 5 \text{ ft}/5280 \text{ ft} = 0.095\%$$

where:

N is the number of samples used to compute the standard deviation $\sigma_{vn}$. A measurement is made, for example, at every cross-tie or tie-plate.

$\sigma_{vn}$ is the standard deviation of the measured velocity in a constant speed run. Its units are in mph.

$D_0$ is the separation between sensors. When converted to miles, a 10 inch separation is $D_0 = 10/(5280*12) = 1.58 \times 10^{-4}$ miles.

DT is the distance traveled in miles.

$V_{ref}$ is average reference speed or velocity during the constant speed run, for example, 10 mph.

For example, using a 10 mph velocity, $\sigma DT/DT = 0.08\%$. $\sigma DT$ values obtained during various experimental constant speed runs ranged from 0.04 to 0.08%, averaging 0.05%—all within the goal of being less than 0.095%.

Although the description of the present invention above is mainly directed at a method and apparatus for measuring speed and distance traveled by trains traveling on standard railroad tracks, it should be recognized that the invention could be applicable to any vehicle traveling over rails. The invention described herein has broad applicability and can provide many benefits as described and shown in the examples above. The embodiments will vary greatly depending upon the specific application, and not every embodiment will provide all of the benefits and meet all of the objectives that are achievable by the invention.

Whenever the terms "automatic," "automated," or similar terms are used herein, those terms will be understood to include manual initiation of the automatic or automated process or step. In the discussion and in the claims, the terms "including" and "comprising" are used in an open-ended fashion, and thus should be interpreted to mean "including, but not limited to . . . ." To the extent that any term is not specially defined in this specification, the intent is that the term is to be given its plain and ordinary meaning. The accompanying drawings are intended to aid in understanding the present invention and, unless otherwise indicated, are not drawn to scale.

Further, it should be recognized that embodiments of the present invention can be implemented via computer hardware, a combination of both hardware and software, or by computer instructions stored in a non-transitory computer-readable memory. The methods can be implemented in computer programs using standard programming techniques—including a computer-readable storage medium configured with a computer program, where the storage medium so configured causes a computer to operate in a specific and pre-defined manner—according to the methods and figures described in this Specification. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits programmed for that purpose.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. For example, while much of the previous description is directed at the use of microwave and IR transmitters/sensors, the invention could be applied using any sensor type that can identify features in or on the rail bed so that the time delay between sensors can be used to determine the vehicle velocity. Other suitable sensor types could include, without limitation, optical, ultraviolet or laser sensors.

As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method for determining distance traveled by a vehicle over railroad tracks, the railroad tracks comprising two rails and a plurality of tie plates connecting the rails to a plurality of cross ties, the method comprising:
   mounting a pair of microwave transceivers to the vehicle a fixed distance apart so that both microwave transceivers lie along a line parallel to the rails and bisecting a portion of the rail tie plate that extends inward past the rail, wherein one microwave transceiver is located closer to the front of the vehicle and one closer to the rear of the vehicle and wherein the microwave transceivers are directed toward to the rail tie plates so that signals transmitted from the microwave transceivers will be reflected back to the same transceiver;
   collecting energy reflected from an identifiable feature in the rail bed as the vehicle moves to determine when each transceiver passes over the identifiable feature;
   determining the time delay between the forward transceiver passing over a feature and the rearward transceiver passing over the same feature;
   from the time delay and the fixed distance between the transceivers, calculating the velocity of the vehicle as the vehicle moves over the identifiable feature;
   repeating this calculation over a given distance for a plurality of identifiable features;
   plotting a velocity versus time curve over the given distance; and
   integrating the curve to determine total distance traveled.

2. The method of claim 1 further comprising:
   mounting a pair of infrared (IR) transceivers to the vehicle a fixed distance apart so that both IR transceivers in each pair lie along a line parallel to the rails, wherein one IR transceiver is located closer to the front of the vehicle and one closer to the rear of the vehicle and wherein the IR transceivers are directed toward to the rail bed so that signals transmitted from the IR transceivers will be reflected back to the same IR transceiver by features on the rail bed;
   collecting infrared signal reflected from an identifiable feature in the rail bed as the vehicle moves to determine when each transceiver passes over an identifiable feature;
   determining the time delay between the forward transceiver passing over a feature and the rearward transceiver passing over the same feature.

3. The method of claim 2 further comprising:
   from the time delay and the fixed distance between the transceivers, calculating the velocity of the vehicle as the vehicle moves over the identifiable feature; and
   repeating this calculation over a given distance for a plurality of rail bed features.

4. The method of claim 2 further comprising:
   comparing the time delay values for the microwave transceivers and the IR transceivers; and
   using an algorithm to select which pair of transceivers' data will be used in the distance traveled calculation, the algorithm based at least partially on a priori knowledge of vehicle velocity constraints.

5. The method of claim 4 in which the algorithm also takes weather conditions into consideration in selecting which pair of transceivers' data will be used in the distance traveled calculation.

6. The method of claim 4 in which data from the microwave transceivers is used for a portion of the velocity versus time curve, data from the IR transceivers is used for a portion of the velocity versus time curve, and the total combined curve is integrated to determine total distance traveled.

7. The method of claim 4 further comprising mounting one or more additional sensor pairs underneath the vehicle so that both sensors in each additional pair are a fixed distance apart along a line parallel to the rails, wherein one sensor in each pair is located closer to the front of the vehicle and one closer to the rear of the vehicle;

using data collected by said sensors as the vehicle moves to determine when each sensor passes an identifiable feature;

determining the time delay between the forward and the rearward sensors;

comparing the time delay values for said additional sensors; and using this time delay data as a part of the overall distance traveled calculation.

8. The method of claim 7 in which the identifiable features in the rail bed comprise individual cross-ties and tie-plates and comprising a first pair of microwave transceivers mounted underneath the vehicle so that the pair of microwave transceivers will pass over the tie-plates along one rail, a pair of IR transceivers mounted toward the center of the vehicle so that the pair of IR transceivers will pass over the cross-ties, and a second pair of microwave transceivers mounted underneath the vehicle so that the second pair of microwave transceivers will pass over the cross-ties.

9. The method of claim 1 in which the identifiable features in the rail bed comprise individual cross-ties or tie-plates.

10. An apparatus for determining distance traveled by vehicle over rails, comprising:

at least one pair of sensors mounted on the vehicle and directed at the rail bed, the sensors spaced apart with a first sensor mounted closer to the front of the vehicle and a second sensor mounted closer to the rear of the vehicle and aligned so that as the vehicle travels over the rails the first sensor will pass over a feature on the rail bed and then the second sensor will pass over the same feature;

a processor to receive signals from the sensors, the signals indicating when each sensor passes over an identifiable feature on the rail bed;

a non-transitory computer-readable memory storing computer instructions, the instructions including a program for:
(i) determining the time delay between the forward sensor passing over an identifiable feature and the rearward sensor passing over the same feature;
(ii) from the time delay and the fixed distance between the sensors, calculating the velocity of the vehicle;
(iii) repeating this calculation over a given distance for a plurality of identifiable rail bed features;
(iv) plotting a velocity versus time curve over the given distance; and
(v) integrating the curve to determine total distance traveled.

11. The apparatus of claim 10 further comprising one or more additional sensor pairs mounted on the vehicle, the additional sensors in each pair mounted a fixed distance apart along a line parallel to the rails, wherein one sensor in each pair is located closer to the front of the vehicle and one closer to the rear of the vehicle.

12. The apparatus of claim 10 in which the sensors are mounted underneath the vehicle so that the sensors do not extend below the top of the rail.

13. The apparatus of claim 10 in which the identifiable features in the rail bed comprise individual cross-ties or tie-plates.

14. The apparatus of claim 11 in which at least one of the one or more sensor pairs comprises a pair of infrared (IR) transceivers mounted so that the IR transceivers are directed toward to the rail bed so that signals transmitted from the IR transceivers will be reflected back to the same IR transceiver by features on the rail bed.

15. The method of claim 14 further comprising one or more additional sensor pairs underneath the vehicle so that both sensors in each additional pair are a fixed distance apart along a line parallel to the rails, wherein one sensor in each pair is located closer to the front of the vehicle and one closer to the rear of the vehicle.

16. The method of claim 15 in which the identifiable features in the rail bed comprise individual cross-ties and tie-plates and comprising a first pair of microwave transceivers mounted underneath the vehicle so that the pair of microwave transceivers will pass over the tie-plates along one rail, a pair of IR transceivers mounted toward the center of the vehicle so that the pair of IR transceivers will pass over the cross-ties, and a second pair of microwave transceivers mounted underneath the vehicle so that the second pair of microwave transceivers will pass over the cross-ties.

17. The method of claim 16 in which the identifiable features used to determine the time delay for the first pair of microwave transceivers comprise the tie-plates on one rail, the identifiable features used to determine the time delay for the pair of IR transceivers comprise the cross-ties, and the identifiable features used to determine the time delay for the second pair of microwave transceivers comprise the cross-ties.

* * * * *